United States Patent [19]

Itoh et al.

[11] Patent Number: 4,774,671
[45] Date of Patent: Sep. 27, 1988

[54] NAVIGATION SYSTEM FOR AUTOMOTIVE VEHICLE INCLUDING FEATURE OF UPDATING VEHICLE POSITION AT EVERY INTERSECTION ALONG PRESET COURSE

[75] Inventors: Toshiyuki Itoh; Hiroshi Ueno; Katuhiko Mizushima, all of Yokosuka, Japan

[73] Assignee: Nissan Motor Company Limited, Kanagawa, Japan

[21] Appl. No.: 838,304

[22] Filed: Mar. 10, 1986

[30] Foreign Application Priority Data

Mar. 14, 1985 [JP] Japan .................................. 60-49362

[51] Int. Cl.⁴ ............................................ G06F 15/50
[52] U.S. Cl. ................................... 364/449; 364/444; 340/988; 340/995
[58] Field of Search ............... 364/443, 444, 449, 460, 364/571, 521; 73/178 R; 342/450, 451; 340/988, 990, 995

[56] References Cited

U.S. PATENT DOCUMENTS

| | | | |
|---|---|---|---|
| 4,490,717 | 12/1984 | Saito ..................................... | 340/995 |
| 4,511,973 | 4/1985 | Miura et al. .......................... | 340/990 |
| 4,535,335 | 8/1985 | Tagami et al. ....................... | 340/988 |
| 4,660,037 | 4/1987 | Nakamura ............................ | 340/990 |
| 4,663,629 | 5/1987 | Tagami et al. ....................... | 340/988 |

Primary Examiner—Gary Chin
Attorney, Agent, or Firm—Lowe, Price, LeBlanc, Becker & Shur

[57] ABSTRACT

A navigation system comprises a vehicle position sensor for monitoring and updating vehicle position, a travel distance sensor monitoring vehicle travel distance, a memory means for storing position data of update points, distances between successive update points, and preset direction of travel of the vehicle at update points, an update zone setting means, responsive to a signal from the vehicle position sensor indicating that the vehicle has reached an update point to within a given range depending upon the distance between the last two update points, for comparing travel distance measured by the travel distance sensor and the distance between said two update points to derive the difference therebetween, and setting an update zone around the next update point based on the derived difference, and a detector means responsive to said signal from the vehicle position sensor for monitoring the direction of travel of the vehicle within the update zone and recognizing that the vehicle is at the update point when the vehicle direction of travel matches the preset direction at the corresponding update point.

16 Claims, 8 Drawing Sheets

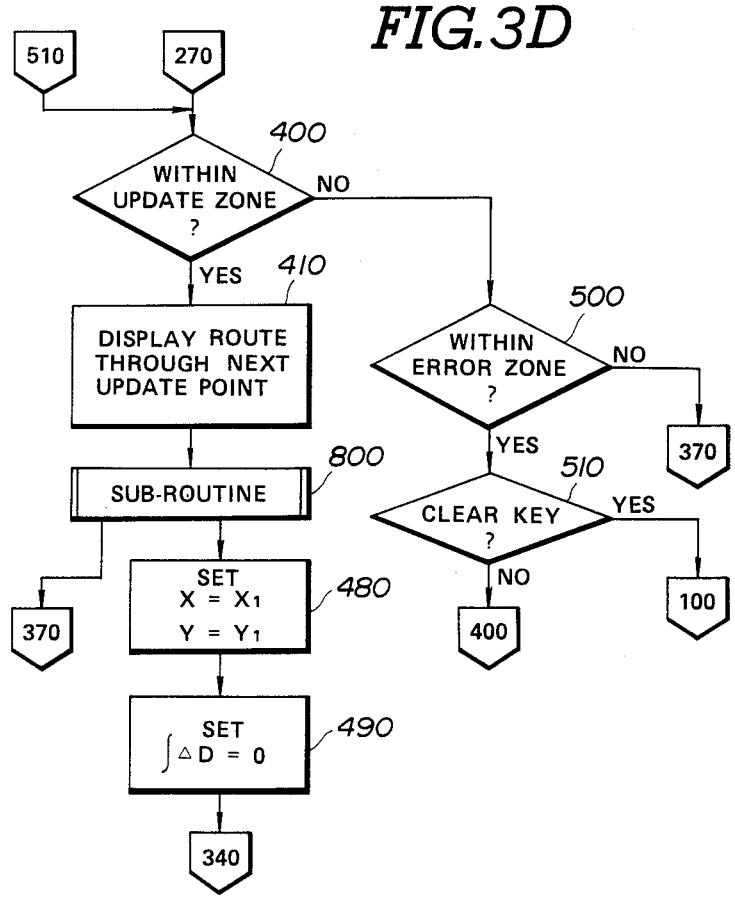

NAVIGATION SYSTEM FOR AUTOMOTIVE VEHICLE INCLUDING FEATURE OF UPDATING VEHICLE POSITION AT EVERY INTERSECTION ALONG PRESET COURSE

BACKGROUND OF THE INVENTION

The present invention relates generally to a navigation system for an automotive vehicle. More specifically, the invention relates to a navigation system with a graphic display on which a road map, the instantaneous position of the vehicle, and a projected course are displayed. In more detail, the invention relates to a system and method for precisely detecting vehicle position and renewing or updating the vehicle position data for accurate navigation.

Recently, various vehicular navigation systems have been proposed including graphic map displays on a display, such as CRT monitors. In all such prior proposed navigation systems, it has been considered essential to monitor vehicle position and update the vehicle position data from time to time as the vehicle travels. Various sensors have been employed to detect the vehicle position.

It is typical arrangement of the sensors for detecting vehicle position to provide a distance sensor which monitors distance travelled by the vehicle and a direction sensor for monitoring the direction of travel of the vehicle. However, with the sensors available nowadays, it is still difficult to precisely detect instantaneous vehicle position and there thus tends to be a certain amount of error. This error tends to accumulate as the distance covered by the vehicle increases. The accumulated error may become significant in cases where the travel distance is relatively long. Due to these accumulated errors, conventional navigation systems have not been adequately reliable for practical use.

On the other hand, when such vehicle position sensors are utilized to monitor relatively short travel distances the error in the resultant vehicle position data is rather small and can be disregarded. Therefore, over relatively short distances, the vehicle position sensors are practical for navigation. Therefore, if the initial position of the vehicle can be renewed or updated accurately at relatively short intervals of vehicle travel, precise navigation would be possible.

SUMMARY OF THE INVENTION

Therefore, it is a principle object of the present invention to provide an automotive navigation system including a feature of renewing or updating vehicle position data at relatively short intervals of vehicle travel.

Another and more specific object of the invention is to provide an automotive navigation system, in which at presettable point or points of the vehicle position data is renewed or updated and which detects when the vehicle reaches a preset point and updates the vehicle position data with the position data of the preset point.

A further object of the invention is to provide an automotive navigation system which includes a feature for compensating for detection errors of sensors between update points to ensure accurate updating of the vehicle position data at the preset points.

According to the present invention, the update points of the vehicle position can be stored with map data. While selecting a course of travel, update points are specified. The distance between each successive pair of update points is derived. An update zone is set up around each update point to help recognize when the vehicle passes the update point. The size of the update zone around the update points varies with the deviation between the arithmetically obtained or preset distance between two successive update points and the actual travel distance.

In practice, the update points may be intersections of roads and/or curves where vehicle direction changes significantly.

In order to implement a navigation process according to the present invention which accomplishes the aforementioned and other objects, the navigation system, according to the present invention, comprises a vehicle position sensor for monitoring and updating vehicle position, a travel distance sensor monitoring vehicle travel distance, a memory means for storing position data of update points, distances between successive update points, and preset direction of travel of the vehicle at update points, an update zone setting means, responsive to a signal from the vehicle position sensor indicating that the vehicle has reached an update point to within a given range depending upon the distance between the last two update points, for comparing travel distance measured by the travel distance sensor and the distance between said two update points to derive the difference therebetween, and setting an update zone around the next update point based on the derived difference, and a detector means responsive to said signal from the vehicle position sensor for monitoring the direction of travel of the vehicle within the update zone and recognizing that the vehicle is at the update point when the vehicle direction of travel matches the preset direction at the corresponding update point.

The update zone setting means compares the derived difference with a predetermined value to determine the point from which the vehicle direction of travel is to be monitored. If the difference is smaller than the predetermined value, it compares the measured distance with the arithmetically derived distance between the update points to detect the point at which to start monitoring the direction of travel, and when the difference is greater than the predetermined value, it recognizes the direction of travel starting point based on the relationship between the preset position data of the update point and the vehicle position data derived by the vehicle position sensor.

According to one aspect of the invention, a navigation system for an automotive vehicle comprises first means for monitoring vehicle motion and deriving first data indicative of vehicle position, second means for monitoring the direction of travel of the vehicle and deriving second data indicative of the vehicle travel direction, third means for storing a map which includes a plurality of known points, fourth means allowing selection of a route for the vehicle and storing the selected routine, the fourth means storing third data indicative of designated known points along the route, and fourth data indicative of a given direction related to each of the designated known points, fifth means for displaying the map stored in the third means, and a symbol representing the vehicle position on the map, and sixth means for deriving instantaneous position of the symbol on the displayed map on the basis of the first data, the sixth means monitoring vehicle position within a travelling zone between successive designated known points for detecting the approach of the vehicle to the next designated known point on the basis of the first data, and detecting when the distance from the vehicle position to the next designated known point is less than a given distance for defining an area centered at the next designated known point, detecting when the vehicle enters the defined area and checking the second data against the given direction so as to detect when the vehicle travel direction matches the given direction and thereby detecting that the vehicle has reached the next designated known point, the sixth means deriving the vehicle travel distance between the last two designated known points, comparing the derived travel distance with the known distance between the last two designated known points so as to derive an error value, and varying the size of the defined area in accordance with the error value.

The sixth means defines a new travel zone each time the vehicle passes a designated known point.

The fourth means stores data indicative of the vehicle travel direction while approaching the next designated known point and the vehicle travel direction leaving the next designated known point, and derives the fourth data so as to represent a direction intermediate the stored directions.

The first means replaces the first data indicative of the vehicle position with position data for the next designated known point when the sixth means detects that the vehicle has reached the next designated known point. The first means replaces the first data with the position data of the next designated known point when the travel distance derived by the sixth means matches the known distance between the two designated points at least within the set area, in cases where the vehicle directions approaching and leaving the next designated known point are the same.

The sixth means defines the defined area as a circular area of variable radius related to the error value when the approaching direction and leaving direction are different, and as an elongated area with its minor axis parallel to the vehicle travel direction, and its major axis perpendicular to the vehicle travel direction.

The first means replaces the first data with the position data of the next designated known point when the vehicle travel distance from the former designated known point is less than the known distance between the two designated known points when the vehicle exits the distal side of the elongated area. The sixth means defines a new travelling zone whenever the first data is replaced with the position data for the next designated known point.

According to another aspect of the present invention a process for navigation of a vehicle along a preset route comprising the steps of:

providing a road map with data for a plurality of known points along a route;

displaying the road map on a visual display screen;

presetting a route across the map and designating known points along the preset route;

defining a travelling zone between a first starting designated known point and a second designated known point along the route;

monitoring vehicle travel distance with the travelling zone and detecting when the vehicle approaches to within a first given area of the second designated known position;

displaying a symbol indicative of the instantaneous vehicle position;

defining a second given area centered at the second designated known point, the radius of the second area varying with the difference between the monitored travel distance and the known distance between the first and second designated points derived when the vehicle enters the first given area;

monitoring vehicle behavior within the second given area for comparison with a predetermined criterion for detecting when the vehicle coincides with the second designated known point; and redefining the travelling zone by taking the second designated known point which currently coincides with the vehicle as the first designated known point and selecting a neighboring designated known point as the second designated known point.

In the preferred process, it includes a step of detecting when the vehicle coincides with the second given area by monitoring vehicle driving direction and comparing the vehicle driving direction with a known direction.

The known direction is derived from a known first vehicle travelling direction assumed by a vehicle approaching the second designated known point and a known second vehicle travelling direction assumed by a vehicle leaving the second designated known point. The known direction is the bisector of the angle subtended by the azimuth vectors of the first and second direction of travel.

In the preferred process, the vehicle coincidence with the second designated known point is detected by comparing the vehicle travel distance within the second distance area with the known distance between the first and second designated known points and detecting when the travel distance matches the known distance.

The position data of the vehicle is updated with the known position data of the second designated known point each time the travelling zone is redefined.

BRIEF DESCRIPTION OF THE DRAWINGS

In the drawings:

FIGS. 3(A), 3(B), 3(C), 3(D) and 3(E) form a flowchart of operation of the preferred embodiment of the navigation system of FIG. 2;

DESCRIPTION OF THE PREFERRED EMBODIMENT

Figure 1:
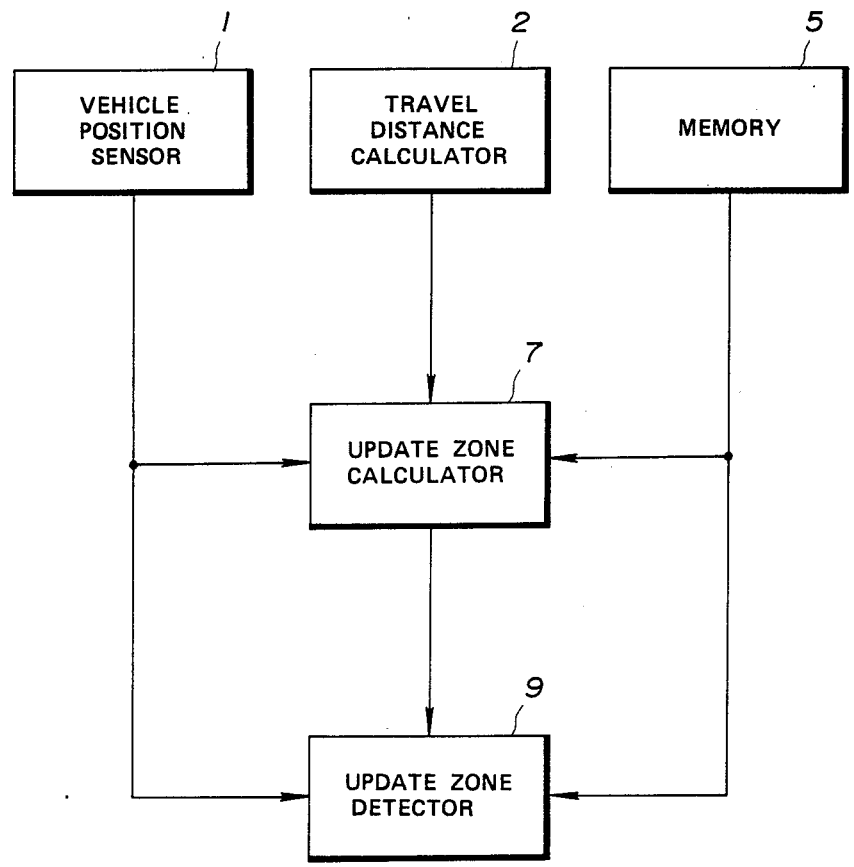
FIG. 1 is a schematic block diagram of the principle features essential to the preferred embodiment of a navigation system according to the invention.

Referring now to the drawings, particularly to FIG. 1, a general concept of the navigation system according to the present invention will be disclosed in order to facilitate better understanding of the detailed description of the preferred embodiment of the navigation system which will be described with reference to FIGS. 2 to 5.

It should be noted that the term "update point" used throughout the disclosure means preset target points along a route to a given destination. As the intersections, major curves and so forth may be selected for use as target points.

In FIG. 1, the navigation system according to the present invention include a vehicle position detecting means 1 which monitors the instantaneous vehicle position and provides data indicative of the instantaneous vehicle position, which will be hereafter referred to as "vehicle position data". The navigation system also has a travel distance derivation means 2 for deriving vehicle travel distance and providing data indicative of the derived vehicle travel distance, which will be hereafter referred to as "distance data", and a memory means 5 which stores data about intersections and curves along a predetermined route to a destination, which intersections and curves are to be recognized during travel along the predetermined route. The data about the intersections and curves will be referred to as "update point data".

The navigation system also has an update zone setting means 7. When the vehicle position detecting means 1 detects that the vehicle is between a first update point and a second update point and within a given distance of the latter, that distance depending upon the distance between the first and second update points, the update zone detecting means 7 sets up an update zone based on the difference between the travel distance data derived by the vehicle travel distance deriving means 2 when the vehicle reaches the aforementioned given distance and the known distance between the first and second update points. The update zone set up by the update zone setting means 7 surrounds the second update point. When the vehicle position detecting means 1 detects that the vehicle is within the update zone set up by the update zone setting means, an update point detector 9 starts to monitor the vehicle direction of travel.

The memory means 5 also stores a given direction for each update point which represents the vehicle direction assumed after passing the update point and will be hereafter referred to as "update direction". The update point detector 9 compares the instantaneous direction of travel of the vehicle with the update direction so as to detect when the vehicle direction of travel matches the update direction, which indicates that the vehicle has passed the update point.

The preferred embodiment of the navigation system according to the present invention will be disclosed hereafter with reference to FIGS. 2 to 5.

Figure 2:
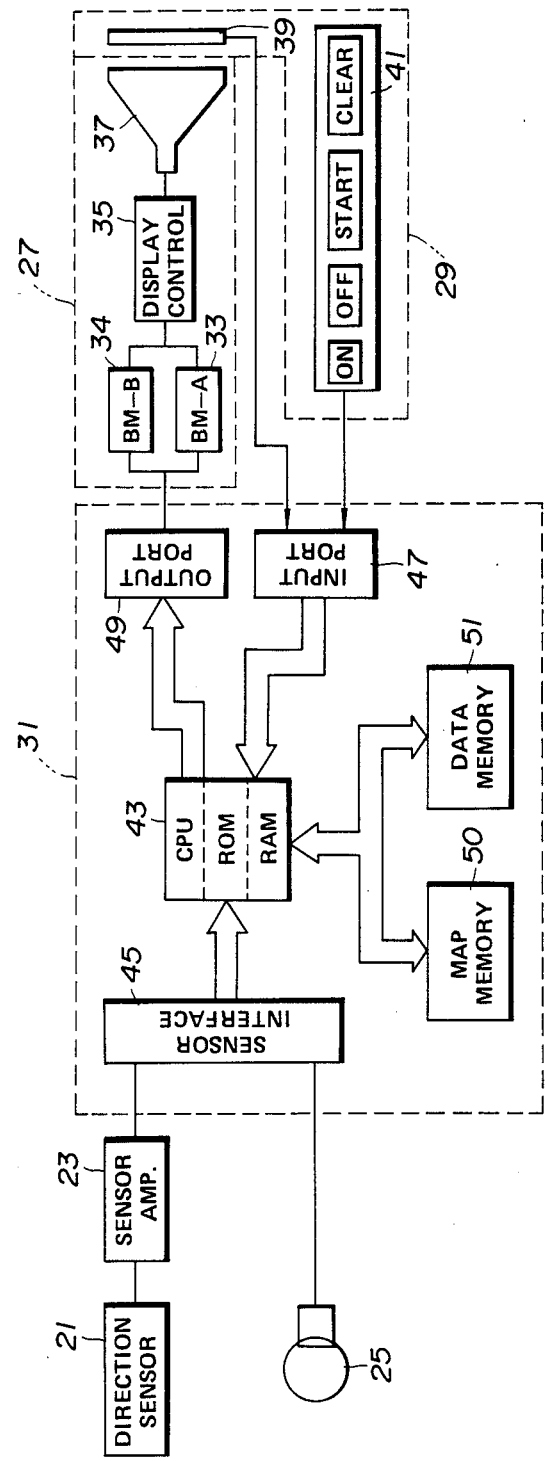
FIG. 2 is a block diagram of the preferred embodiment of a navigation system according to the present invention.

FIG. 2 shows the preferred embodiment of the navigation system for implementing a method for detecting update points along a preset vehicle route.

The navigation system includes a vehicle direction of travel sensor 21 which may comprise a magnetic compass, for example. The preferred construction of the magnetic compass is as disclosed in SAE paper SP-80/458/S02.05, published by the Society of Automotive Engineering, No. 800123 by H. Ito et or 3-axis Rate Gyro Package Parts No. PG24-N1, of Kabushiki Kaisha Hakushin Denki Seisakusho, February, 1979. Also, a suitable magnetic compass is disclosed in British Patent First Publication No. 2,102,259, published on Jan. 26, 1983, which corresponds to German Patent First Publication No. 32 17 880, published on Nov. 25, 1982, British Patent First Publication No. 2,100,001, published on Dec. 15, 1982, which corresponds to German Patent First Publication No. 32 13 630, published on Nov. 18, 1982, and German Patent First Publication No. 33 05 054, published on Aug. 25, 1983. The contents of the above-identified publications are hereby incorporated for the sake of disclosure.

A travel distance sensor 25 monitors vehicular driving wheel rotation in order to monitor vehicle direction of travel. The travel distance sensor 25 produces a travel distance indicative pulse with every predetermined interval of operation of the vehicular wheel.

The direction of travel sensor 21 is connected to a processing unit 31 via a sensor amplifier 23 which amplifies the direction of travel indicative sensor signal produced by the travel direction sensor, and a sensor interface 45 in the processing unit. The travel distance sensor 25 is also connected to the processing unit 31 via the sensor interface 45. The processing unit 31 has an output port 49 connected to a display unit 27 which includes buffer memories 33 and 34, a display controller 35 and a display device 37 which may be a CRT monitor, for example. The processing unit 31 also has an input port 47 connected to an input unit 29 including a key-switch array 41 and a transparent touch panel 39 which comprises a plurality of pressure responsive segments or thermo-responsive segments which accepts inputs by way of touching different points on the display screen. The touch panel 39 is therefore placed on the display screen so as to overlie the map displayed on the display screen to allow convenient input of position data. The function of the touch panel 39 can be imagined as being equivalent to the conventional light pen.

The processing unit 31 comprises a microprocessor made up of the aforementioned sensor interface 45, an input port 46, the output port 49, and in addition, built-in CPU, ROM and RAM units. A monolithic processing unit may serves as the microprocessor constructed as set forth above for ease of installation in the vehicular space. The processing unit 31 also includes a map memory 50 which stores map data for various locations. In order to store an adequately large volume of map data, the map memory 50 may be an external memory with a large-capacity storage medium, such as a read-only compact disk (CD). The processor unit 31 further includes a temporary data memory 51 for storing data concerning the preset route including position data, intersection configuration data and so forth for the preset update points.

The contents of the map memory has been discussed in German Patent First Publication No. 35 10 481. The contents of the above-identified German Patent First Publication are hereby incorporated by reference for the sake of disclosure. In brief, the map memory has a large number of memory blocks divided into groups of pages, each of which represents a large map area. Each page is further divided into a plurality of blocks representing smaller areas which may correspond to a single frame of the display screen. Each group of memory blocks storing the data for the corresponding map block further includes a plurality of additional memory blocks storing data about specific feature, such as intersections, major curves and so forth. The contents of the additional memory blocks may include identification of specific features, neighboring features intersection configurations, size information and so forth. The map memory 50 also has an index of map areas and map blocks. This index can be displayed on the display screen 37.

The operation of the preferred embodiment of the navigation system according to the present invention will be disclosed below with reference to FIGS. 3 to 5, which are flowcharts of a navigation program to be executed by the microprocessor.

Referring now to FIGS. 3(A) to 3(E), the navigation program is stored in ROM in the processing unit 31. The preferred embodiment of the navigation system starts operating in response to depression of an ON key in the key-switch array 41 of the input unit 39.

Figure 3A:
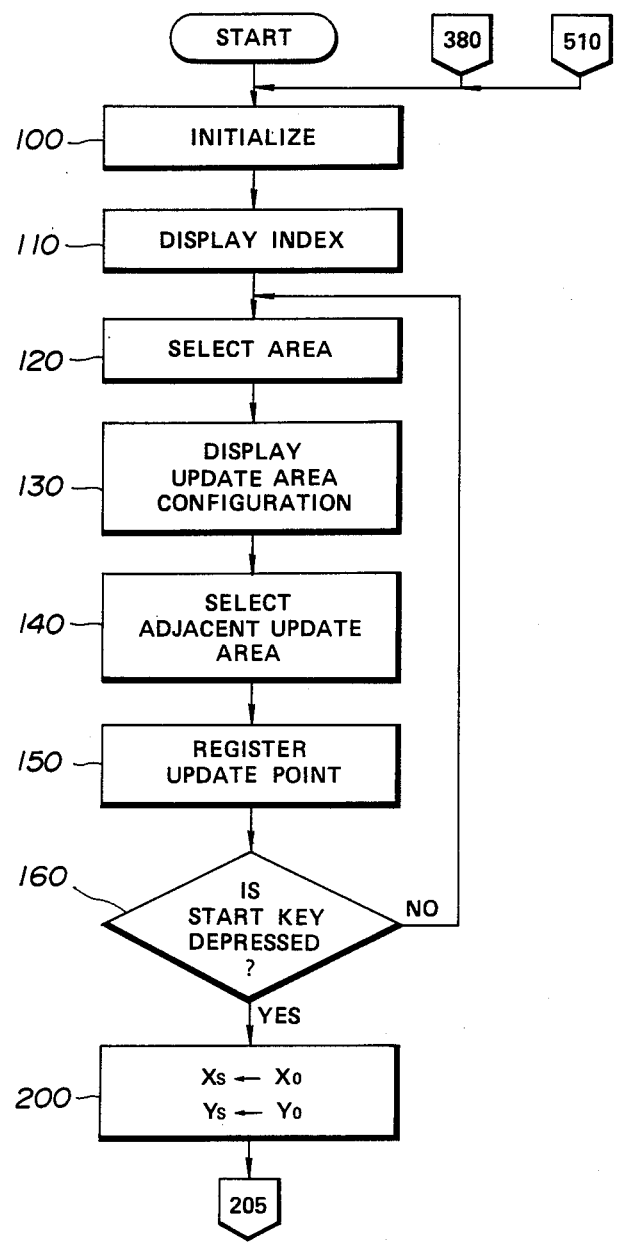

As shown in FIG. 3(A), immediately after starting operate, the system is initialized at a step 100. The map index stored in the map memory 50 is then read out and displayed on the display screen 37, at a step 110. A map block including a starting point can then be selected from the map index at a step 120. A map block can be selected by way of a ten-key in the key-switch array 41 of the input unit 39 by entering identification, such as a several-digit code representative of a corresponding map block. Upon entry of the identification of the map block of the starting point at the step 120, the designated map area is displayed on the display screen 37.

A point on the map corresponding to the starting point or the update point nearest the starting point is touched through the touch panel 39. The touch panel 39 then sends a signal to the microprocessor indicative of the position of the starting point or the update point closest to the starting point. The microprocessor is responsive to the signal from the touch panel 39 to register the position data of the point designated through the touch panel and to display the identified update point on the display, at a step 130. At the same time, neighboring update points around the update point or starting point identified by the signal from the touch panel 39 are also displayed on the display screen 37. Update points identified by signals from the touch panel 39 will hereafter be referred to as "designated update point". Also, the signal produced by the touch panel 39 and identifying a point on the map will be hereafter referred to as "designated position indicative signal".

The display screen 37 in response to the designated position indicative signal also shows the configuration of the designated update point when the point identified by the designated position indicative signal is an update point.

At a step 140, one of the update points adjoining the designated point is selected in accordance with the destination of the vehicle. Similarly to selection performed in the step 120, the next update point is identified through the touch panel 39. The touch panel 39 thus produces the designated update point indicative signal identifying the update point designated at the step 140. The microprocessor is responsive to the designated update point indicative signal to register the position of the designated update point at a step 150.

After the step 150, the START key in the switch-key array 41 is checked to see whether it is depressed or not. The START key in the switch-key array 41 triggers actual vehicle navigation according to the preset data. Therefore, the START key is to be depressed after presetting of the route to the destination has been completely preset. Failure to depress the START key at step 160 means the route to the destination is not yet complete. Therefore, the process returns to the step 120. Step 120 allows the selected map area to be replaced by any adjoining map area as the route develops from the starting points toward the destination.

The update points designated at the step 140 and update points neighboring thereto, and the configuration of the designated update point are displayed on the display screen to facilitate selection of the next update point. By repeating the steps 130 to 160, all of the update points along the route to the destination are registered in the data memory 51. The data memory 51 stores the data for all of the update points defining the route in sequence.

After all of the update points have been selected through the steps 120 to 160, the START key is depressed. In response to depression of the START key, the answer at the step 160 becomes YES and thus the navigation process starts.

Figure 3B:
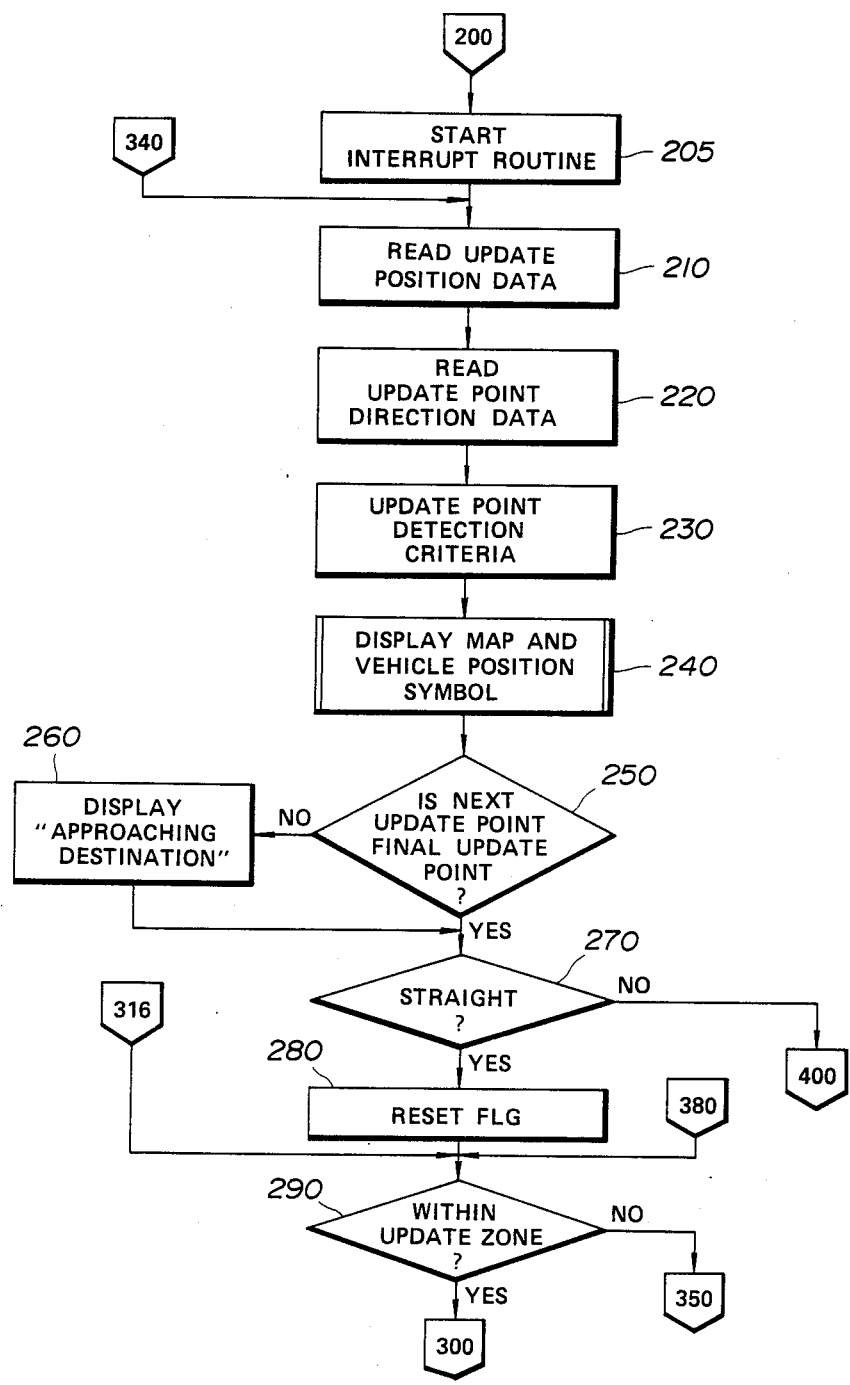
Figure 3C:
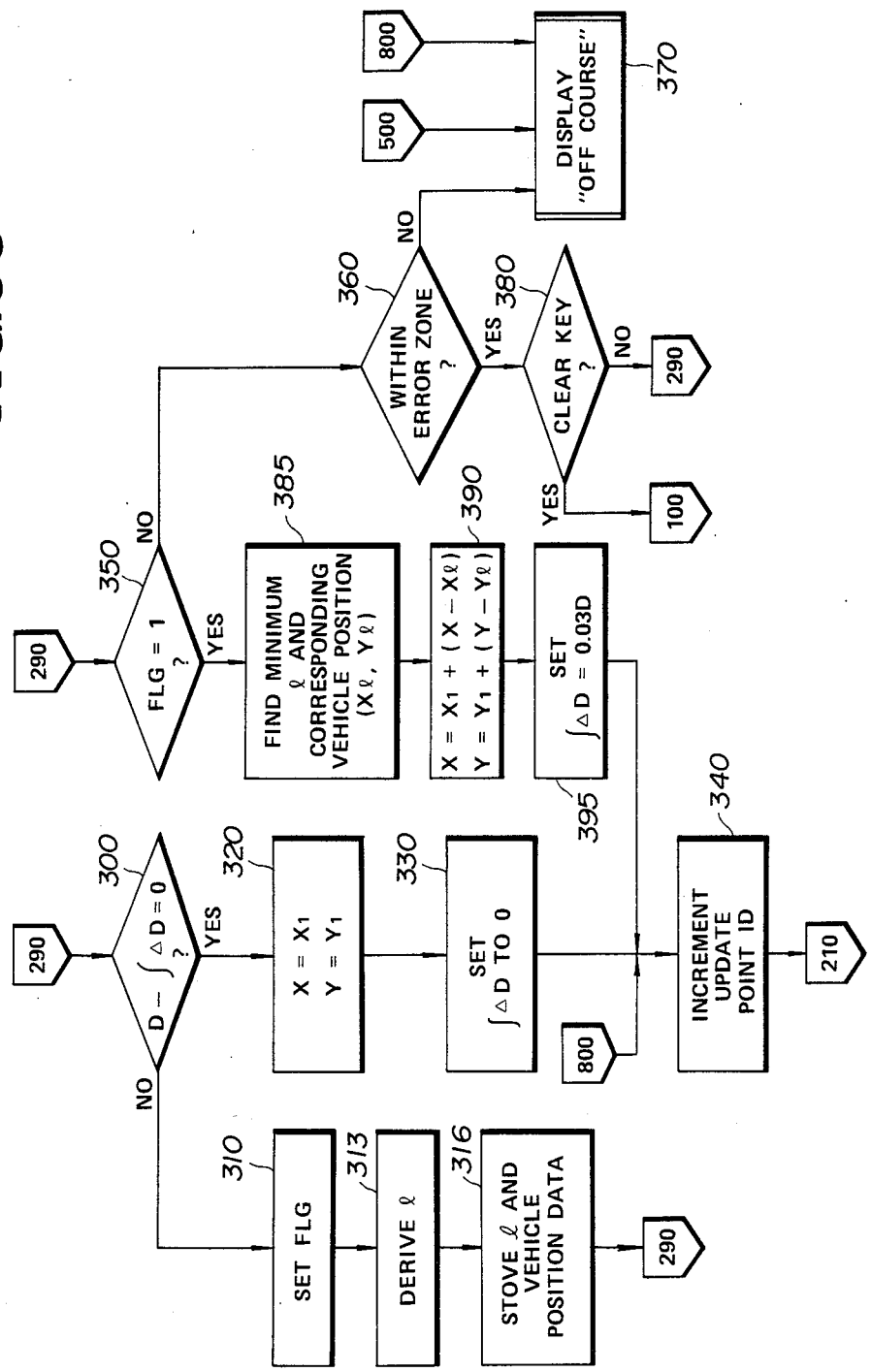

Immediately after the navigation process starts, the data for the first update point or the starting point is transferred to the buffer memory of the display unit 27 to allow x-y plotting of the first update point or the starting point in the display map coordinate system at a step 200 of FIG. 3(B). Initially, the x- and y-coordinates of the first update point or the starting point $(x_s, Y_s)$ are set to initial position coordinates $(x_0, y_0)$.

After the vehicle starts to move, the interrupt routine shown in FIG. 3(E) is triggered at given distance intervals monitored by the travel distance sensor 25. The interrupt routine is enabled at a step 205 in FIG. 3(B). However, it should be appreciated that each cycle of execution of the interrupt routine of FIG. 3(E) is triggered independently of the navigation program and thus the timing thereof does not necessarily coincide with the step 205.

In the interrupt routine, accumulated distance traveled from the initial point $(x_0, y_0)$ is calculated. Since the interrupt routine is triggered after every given interval $\Delta D$ of travel of the vehicle, the distance covered by the vehicle from the starting point or the most recent update point will be the sum of all $\Delta D$'s, which will be hereafter referred to as "total travel distance $\int \Delta D$", at a step 600 in the interrupt routine. Also, in the step 600, the instantaneous vehicle position coordinates $(x, y)$ in the display map coordinate system are derived according to the following equations:

$$x = x_0 + \int (\Delta D \times \cos \theta)$$

$$y = y_0 + \int (\Delta D \times \sin \theta)$$

The derived total travel distance $\int \Delta D$ and the instantaneous vehicle position $(x, y)$ are transferred to the buffer memory in the display unit 27 for use in update vehicle position symbol on the map display, which is actually performed in the subsequent, final step 610.

At a step 210, data for the next two update points are read out from the data memory 51. These include distance data indicative of the distance D from the first update point to the next update point and the known coordinates $(x_n, y_n)$ of the next update point in the display map coordinate system. At the step 220, direction data indicative of the orientation of the vehicle as it approaches the next update point from the most recent update point, which direction will be hereafter referred to as "entry direction $\theta$in" and the direction of vehicle as it travels away from the next update point, which direction will be hereafter referred to as "exit direction $\theta$out".

At a step 230, criteria for recognizing an update point are derived. These include an update direction value $\theta_r$ derived from the entry direction $\theta_{in}$ and the exit direction $\theta_{out}$. The update direction $\theta_r$ is basically the bisector of the angle subtended by the entry direction $\theta_{in}$ and the exit direction $\theta_{out}$. It is derived in the following manner:

when the absolute value of the difference $\Delta\theta$ between the entry direction $\theta_{in}$ and the exit direction $\theta_{out}$ is smaller than 180°, the update direction $\theta_r=(\theta_{in}+\theta_{out})/2$; and when the difference $\Delta\theta$ is greater than 180°, the update direction $\theta_r=(\theta_{in}+\theta_{out})/2+180$.

At the step 230, an update zone which extends a given distance from the next update point $(x_1, y_1)$ is also erived. The configuration of the update zone varies depending upon a distance D between the first update zone or the starting point and the next update zone. The configuration of the update zone is defined by the intersection of a circle and an elongated rectangle centered on the next update point $(x_1, y_1)$. The radius of the circle about the next update point is 0.1D. The minor axis of the rectangle is 0.06D centered on the update point and its major axis is longer than the radius of the circle. This figure is actually the geometric result of two criteria for recognizing that the vehicle position approximates coincides with the update point, namely; (1) that the current detected vehicle position is within 0.1D of the update point; and, (2) that the total travel distance $\int \Delta D$ is within $\pm 0.03D$ of the known distance between the two update points in question. Note that the relatively high accuracy of the travel distance sensor is reflected in the 0.03D value and the relatively low directional accuracy is reflected in the 0.1D value.

An error zone is also set up in step 230. The error zone is in the form of a rectangle extending from the first update point or the starting point to the next update point. In addition, the longitudinal ends of the rectangle are defined by circles of radius 1.1D centered on the two update points. The rectangle is 0.5D wide, so that the error zone covers a corridor 0.25D to either side of the line connecting the update points and extending about 0.1D past both update points. Note that this area covers the update zone completely. Furthermore, the route followed by the vehicle cannot deviate by more than 0.25D from the straight-line path—this imposes a need for extra preset update points on especially circuitous roads.

At a step 240, map and the vehicle position symbol are displayed on the display screen 37 so as to renew the display for the next update point. Then, at a step 250, the program checks to see whether or not the next update point is the one closest to the destination. The update point closest to the destination will be referred to as the "final update point". If the next update point is the final update point, a message "APPROACHING DESTINATION" is displayed on the display screen 37. In either case, at a step 270, the preset route is checked to see if the vehicle is to pass straight through the update point rather than turning.

If the vehicle is to pass straight through the update point, a flag FLG is reset at a step 280. Otherwise control passes to a step 400 which will be discussed later. After the flag FLG is reset at the step 280, the programs checks to see if the vehicle is in the update zone, at a step 290. If the vehicle is in the update zone, control passes to a step 300; otherwise the program goes to a step 350.

At the step 300, the distance $\int \Delta D$ travelled since the last update point is compared with the known distance D between the two updating points. If the measured distance $\int \Delta D$ matches the known distance D, when checked at the step 300, control passes to a step 320 in which the vehicle position coordinates (x, y) are replaced by the coordinates $(x_1, y_1)$ of the current update point. Thereafter, at a step 330, the travel distance $\int \Delta D$ between the update points is reset to zero. Then, data identifying the current pair of update points is updated so as to point to the next stretch of the preset route at a step 340. Thereafter, control returns to the step 210.

On the other hand, if the difference between the measured distance $\int \Delta D$ and the known distance D is other than zero at step 300, the flag FLG is set at a step 310. The distance l between the update point $(x_1, y_1)$ and the instantaneous vehicle position (x, y) is derived according to the following formula, at a step 313:

$$l=(x-x_1)^2+(y-y_1)^2$$

At a step 316, the calculated distance l and the instantaneous vehicle position coordinates (x, y) are stored for later reference. Then control returns to the step 290. The steps 290, 300, 310, 313 and 316 are repeated until the vehicle leaves the update zone or the difference between the calculated distance $\int \Delta D$ and the known distance D reaches zero when as checked at the step 300, i.e. until the vehicle reaches the update point.

If the vehicle is outside of the update zone at step 290, then the flag FLG is checked at a step 350. If the flag FLG is set, the stored data indicative of the distance l are checked to find the minimum value, i.e. the closest approach to the update point, at a step 385. At the step 385, the coordinates $(x_l, y_l)$ of the vehicle position at which the minimum distance l is obtained are read out. At steps 390 and 400, the vehicle position coordinates are adjusted to approximate the correct position. This adjustment is based on the assumptions that the closest approach $(x_l, y_l)$ was in fact the update point $(x_1, y_1)$ and that the vehicle is now 0.03D past the update point. The new coordinates are given by the following equations:

$$X=X_1+(X-X_s)$$

$$Y=Y_1+(Y-Y_s).$$

The travel distance value $\int \Delta D$ is set to 0.03D as an initial value in step 400, and then control passes to the step 340.

If the flag FLG is not set when checked at the step 350, the program checks to see whether the vehicle is in the error zone, at a step 360. If NO, i.e., if the vehicle is outside of the error zone, the message "OFF COURSE" is displayed on the display screen, at a step 370 and the program ends. On the other hand, if the vehicle is still within the error zone, the program checks the CLEAR key in the switch-key array 41, at a step 380. If the CLEAR key has been depressed at the step 380, control returns to the initializing step 100. Otherwise, control passes to the step 290.

If the vehicle is to change direction significantly (step 270), control passes to a step 400, which checks to see if the vehicle is in the update zone. If so, the planned route through the current update point is displayed graphically on the screen to aid the driver at this crucial point. The display image generated at the step 410 includes a number of indicator segments, each indicative of a given distance of vehicle travel arranged along the route in both entry and exit directions. After the step 410, one of the sub-routines as shown in FIGS. 4 and 5 is executed.

On the other hand, if the vehicle is not within the update zone when checked at the step 400, then the vehicle position is again checked to see if it is still within the error zone, at a step 500.

If the vehicle is outside of the error zone when checked at the step 500, the message "OFF COURSE" is displayed on the screen at the step 370. On the other hand, if the vehicle is within the error zone when checked at the step 500, then, the program checks whether the CLEAR key has been depressed or not, at a step 510. If the CLEAR key has been depressed, then control returns to the initialization step 100; otherwise control returns to the step 400.

Figure 4:
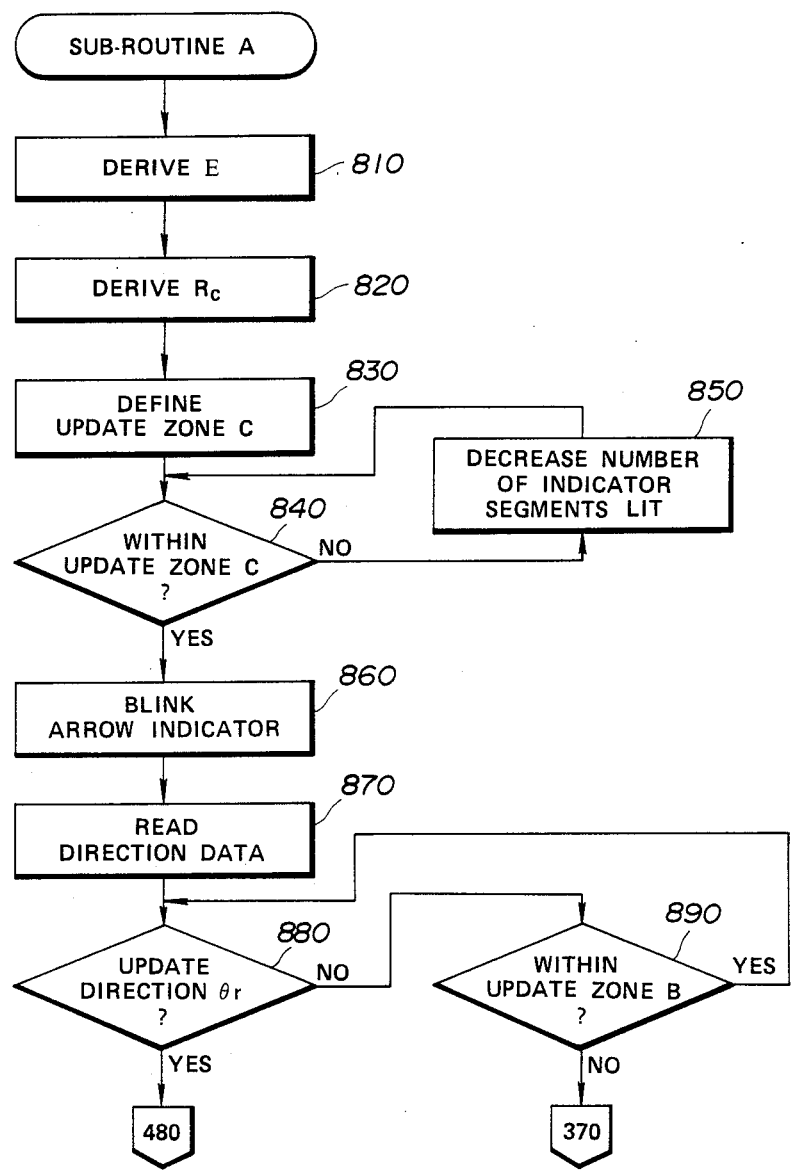
FIG. 4 is a flowchart of a subroutine of the navigation program of FIG. 3.

The sub-routine of FIG. 4 is triggered when the vehicle enters the circular update zone B. At a step 810, the difference between the measured travel distance $\int \Delta D$ and the known distance D between the update points is derived. The obtained difference is subtracted from the radius 0.1D of the circular update zone, and the absolute value of this result is divided by the known distance value D to derive an error rate value $\epsilon$. This error rate $\epsilon$ is representative of the error between the known distance and the measured distance due possibly to errors in either the map data or in the measurement of the travel distance by the distance sensor 25. A small error rate means that the measured travel distance $\int \Delta D$ will tend to match the known distance D. On the other hand, a large error rate means that the travel distance value $\int \Delta D$ will differ significantly from the known distance.

As the error rate increases, the update zone, within which the vehicle driving direction is monitored and compared with the update direction in order to detect when the vehicle reaches the updating point, must widen so as to allow for greater error. Accordingly, a circular update zone C of variable radius is set up at a step 820. The radius of the update zone C is derived from the following formula:

$$R_c = \gamma \times \epsilon \times D$$

Therefore, when the error rate $\epsilon$ is small, the radius $R_c$ of the update zone C will also be small. On the other hand, when the error rate $\epsilon$ is large, so is the radius $R_c$ of the update zone C. The minimum and maximum radii of the update zone C are limited respectively to 100 m and 0.1D which corresponds to the radius of the fixed radius update zone set up in step 230. Using the radius $R_c$ determined at the step 820, the update zone C is defined to be centered on the update point $(x_1, y_1)$, at a step 830. After this, the vehicle position $(x, y)$ is checked at a step 840 to see if the vehicle is within the update zone C.

If the vehicle is outside of the update zone C when checked at the step 840, then distance indicator segments on the display screen 37 are turned OFF one-by-one at given intervals of vehicle travel at a step 850.

On the other hand, if the vehicle is in the update zone C when checked at the step 840, then arrow symbols uded as the distance indicator segments mentioned above start to blink at a step 860. Thereafter, the vehicle driving direction is read out at a step 870. The read vehicle direction of travel is compared with the update direction at a step 880. If the vehicle direction of travel does not match the update direction, the program, then checks to see if the vehicle is within the fixed-radius update zone at a step 890. If the vehicle is still within the fixed-radius update zone B, control returns to the step 880; otherwise, control returns to the step 370 set forth above.

Once the vehicle travel direction matches the update direction when checked at the step 880, the vehicle position data $(x_0, y_0)$ are replaced by the position data $(x_1, y_1)$ of the update point the vehicle just reached, at a step 480. Thereafter, the travel distance $\int \Delta D$ is reset to zero, at a step 490. Then, control returns to the step 340 to repeat the navigation process for the next preset update point.

Figure 5:
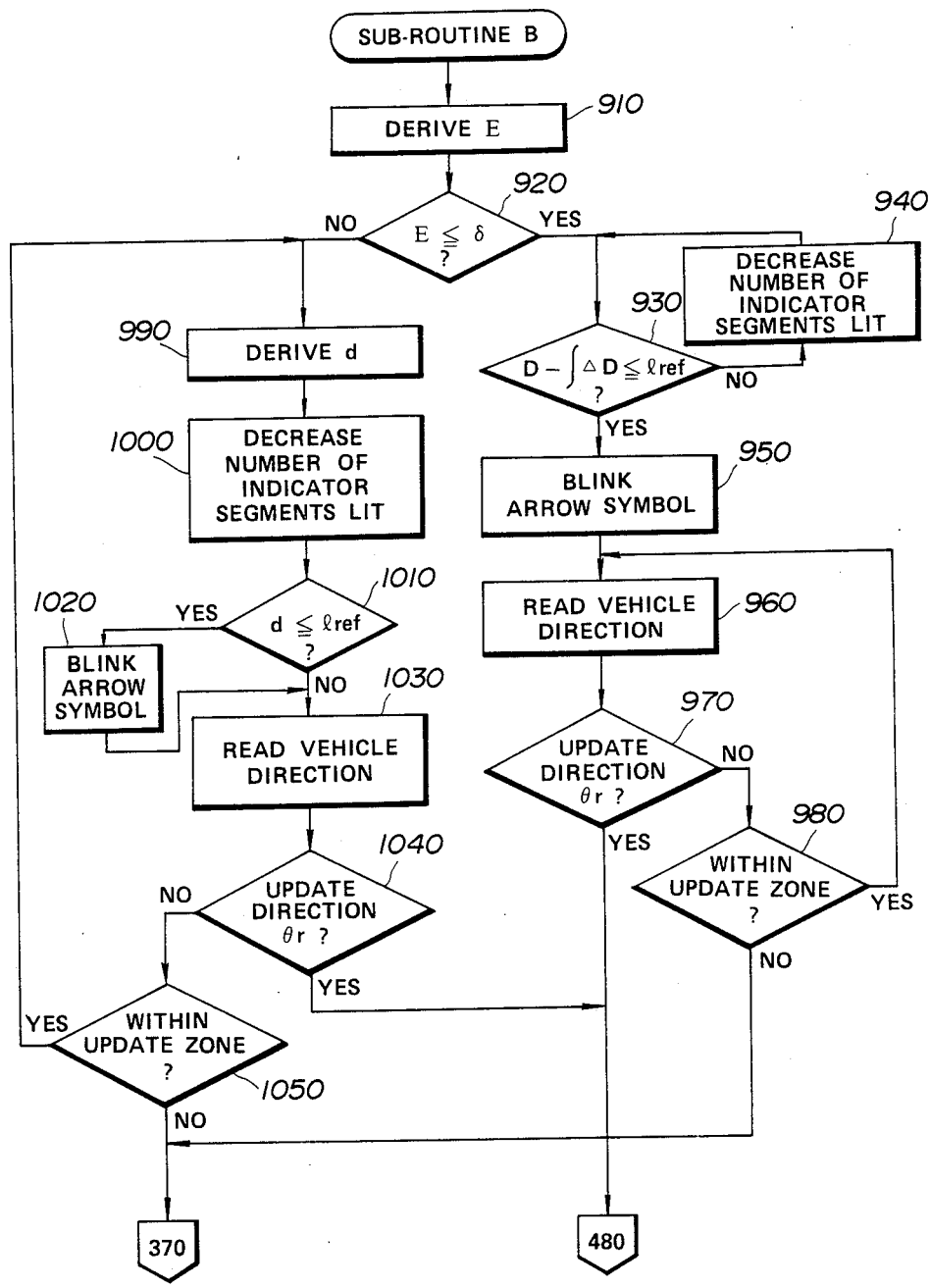
FIG. 5 is a flowchart of another subroutine of the navigation program of FIG. 3.

FIG. 5 shows a modification to the sub-routine of FIG. 4. As in the sub-routine of FIG. 4, the error rate $\epsilon$ is derived at a step 910. The derived error rate $\epsilon$ is compared with a reference value $\delta$ at a step 920. If the error rate $\epsilon$ is equal to or less than the reference value $\delta$, the program goes to a step 930, in which the difference between the travel distance $\int \Delta D$ and the known distance D between the update points is compared with a predetermined distance value $l_{ref}$ at a step 930. If the difference $(D - \int \Delta D)$ is greater than the predetermined distance value $l_{ref}$, then the distance indicator segments are turned OFF one-by-one per unit of distance travelled by the vehicle in a step 940.

If the difference $(D - \int \Delta D)$ becomes equal to or less than the predetermined distance value $l_{ref}$, the arrow symbol serving as the distance indicator segment blinks at a step 950. Thereafter, the vehicle direction of travel is read out at a step 960. The read direction of travel is compared with the update direction $\theta_r$ at a step 970. If the direction of travel does not match the update direction, a step 980 checks to see if the vehicle is within the fixed-radius update zone B. If the vehicle is still within the fixed-radius update zone, then control returns to the step 970; otherwise control returns to the step 370. On the other hand, if the direction of travel matches the update direction when checked at the step 970. then control passes to the step 480 of FIG. 4.

If the error rate $\epsilon$ is greater than the reference value $\delta$ when checked at the step 920, then the distance d between the vehicle position $(x, y)$ and the update point $(x_1, y_1)$ is calculated at a step 990. At a step 1000, the distance indicator segments are turned OFF one-by-one for each given unit of vehicle travel. Then, the distance d derived at the step 990 is compared with the predetermined distance value $l_{ref}$ at a step 1010. If the distance d is equal to or less than the predetermined distance value $l_{ref}$, the arrow symbol blinks at a step 1020. Otherwise, the update direction $\theta_r$ is read out at a step 1030. The vehicle direction is compared with the updating direction in a step 1040, which is identical to step 970 except that control passes to step 1050 if the two directions do not match. Similarly, step 1050 is identical to step 980 except that control returns to step 990 if the vehicle is still within the fixed-radius update zone B.

Therefore, according to the present invention, it is assured to detect the vehicle passing across known points on the route of travelling. Thus navigation for the vehicle in precise and reliable manner becomes possible.

Thus, the present invention fulfills all of the objects and advantages sought therefor.

What is claimed is:

1. A navigation system for an automobile vehicle comprising:
    first means for monitoring vehicle motion and deriving first data indicative of vehicle position;
    second means for monitoring the direction of travel of the vehicle and deriving second data indicative of the vehicle travel direction;

third means for storing a map which includes a plurality of known points;

fourth means for selecting a route for the vehicle, said fourth means including data storage means for storing the selected routine, storing third data indicative of designated known points along said route, and fourth data indicative of a given direction related to each of said designated known points;

fifth means for displaying said map stored in said third means, and a symbol representing the vehicle position on said map; and sixth means for deriving instantaneous position of said symbol on the displayed map on the basis of said first data, said sixth means monitoring vehicle position within a travelling zone between successive designated known points for detecting the approach of the vehicle to the next designated known point on the basis of said first data, and detecting when the distance from said vehicle position to said next designated known point is less than a given distance for defining an area centered at said next designated known point, detecting when the vehicle enters said defined area and checking said second data against said given direction so as to detect when the vehicle travel direction matches said given direction and thereby detecting that the vehicle has reached said next designated known point, said sixth means deriving the vehicle travel distance between the last two designated known points, comparing said derived travel distance with the known distance between said last two designated known points so as to derive an error value, and varying the size of said defined area in accordance with said error value.

2. A navigation system as set forth in claim 1, wherein said sixth means defines a new travel zone each time the vehicle passes a designated known point.

3. A navigation system as set forth in claim 1, wherein said fourth means stores first direction data indicative of the vehicle travel direction while approaching said next designated known point and second direction data indicative of the vehicle travel direction leaving said next designated known point, and derives said fourth data so as to represent a direction intermediate said stored first and second direction data.

4. A navigation system as set forth in claim 2, wherein said first means replaces said first data indicative of said vehicle position with position data for said next designated known point when said sixth means detects that the vehicle has reached said next designated known point.

5. A navigation system as set forth in claim 3, wherein said first means replaces said first data indicative of said vehicle position with position data for said next designated known point when said sixth means detects that the vehicle has reached said next designated known point.

6. A navigation system as set forth in claim 5, wherein said first means replaces said first data with the position data of said next designated known point when the travel distance derived by said sixth means matches the known distance between the two designated points at least within said defined area, in cases where the vehicle directions approaching and leaving said next designated known point are the same.

7. A navigation system as set forth in claim 6, wherein said sixth means defines said defined area as a circular area of variable radius related to said error value when said approaching direction and leaving direction are different, and as an elongated shaped area with a minor axis parallel to the vehicle travel direction and a major axis perpendicular to said vehicle travel direction.

8. A navigation system as set forth in claim 7, wherein said first means replaces said first data with the position data of said next designated known point when the vehicle travel distance from a former designated known point is less than said known distance between said two designated known points when the vehicle exits the distal side of said elongated shaped area.

9. A navigation system as set forth in claim 8, wherein said sixth means defines a new travelling zone whenever said first data is replaced with the position data for said next designated known point.

10. A process for navigation of a vehicle along a preset route comprising the steps of:

providing a road map with data for a plurality of known points along a route;

displaying said road map on a visual display screen;

presetting a route across said map and designated known points along the preset route;

defining a travelling zone between a first starting designated known point and a second designated known point along said route;

monitoring vehicle travel distance within said travelling zone and detecting when the vehicle approaches to within a first given area of said second designated known point;

displaying a symbol indicative of the instantaneous vehicle position;

defining a second given area centered at said second designated known point, the radius of said second area varying with the difference between the monitored travel distance and the known distance between said first and second designated points;

monitoring vehicle position within said second given area for comparison with a predetermined criterion for detecting when the vehicle coincides with said second designated known point; and redefining said travelling zone by taking the second designated known point which currently coincides with said vehicle as said first designated known point and selecting a neighboring designated known point as said second desingated known point.

11. The process as set forth in claim 10, which detects when the vehicle coincides with said second given area by monitoring vehicle driving direction and comparing said vehicle driving direction with a known direction.

12. The process as set forth in claim 11, wherein said known direction is derived from a known first vehicle travelling direction assumed by a vehicle approaching said second designated known point and a known second vehicle travelling direction assumed by a vehicle leaving said second designated known point.

13. The process as set forth in claim 12, wherein said known direction is the bisector of the angle subtended by the azimuth vectors of said known first and second direction of travel.

14. The process as set forth in claim 13, wherein a coincidence of said vehicle with said second designated known point is detected by comparing said vehicle travel distance within said second distance area with the known distance between said first and second designated known points and detecting when the travel distance matches said known distance.

15. The process a set forth in claim 14, wherein a coincidence of said vehicle with said second designated known point is detected by monitoring vehicle position derived from said vehicle travel distance data and vehicle driving direction data and detecting when the vehicle reaches the distal border of said second given area.

16. The process as set forth in claim 15, wherein a position data of the vehicle ls updated with the known position data of said second designated known point each time said travelling zone is redefined.

* * * * *